(No Model.)
C. T. HAM.
TUBULAR LANTERN.
No. 436,416. Patented Sept. 16, 1890.
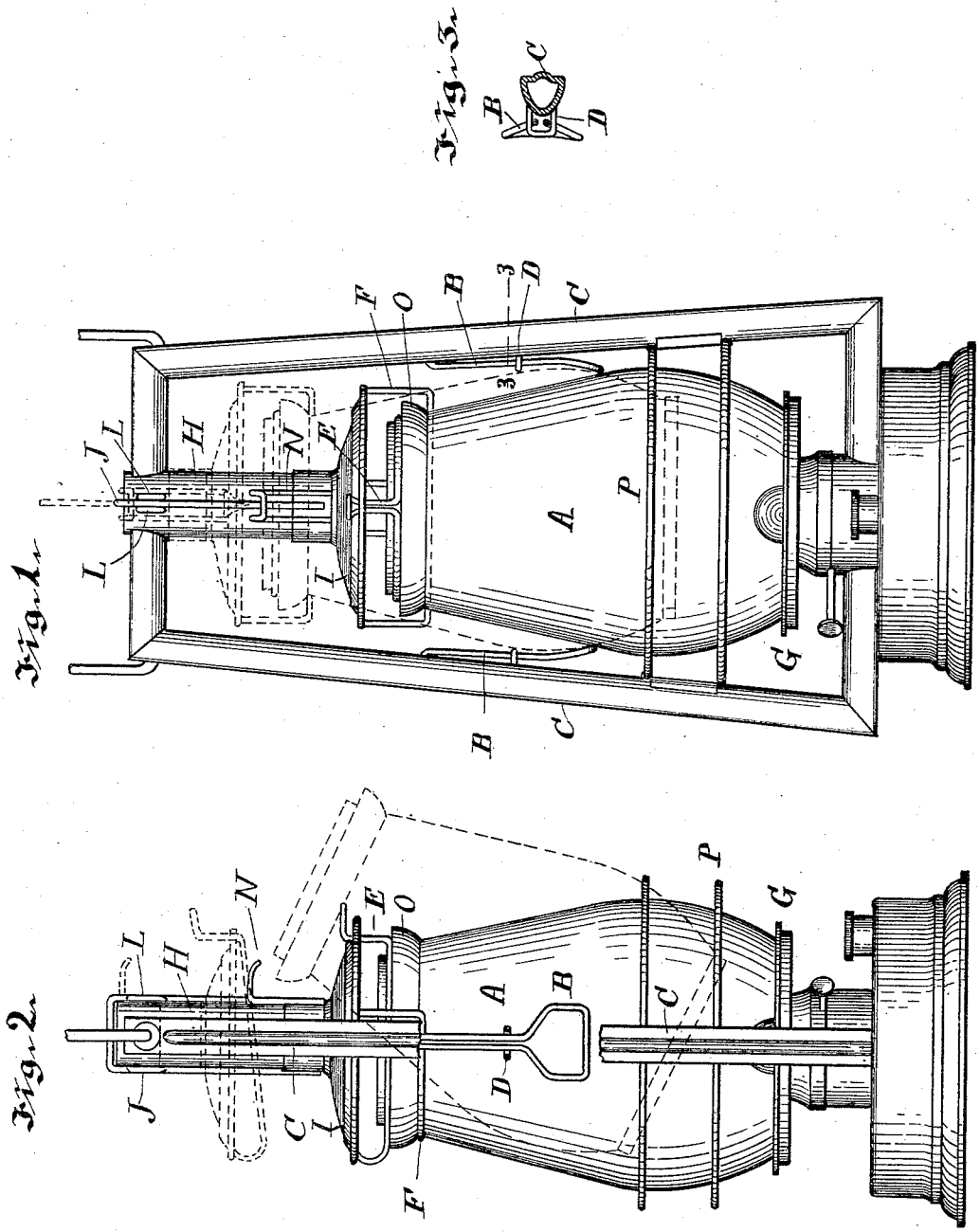
Witnesses
J. Watson Sims
E. G. Crannell
Inventor
Charles T. Ham,
By Geo. B. Selden,
Atty.

UNITED STATES PATENT OFFICE.

CHARLES T. HAM, OF ROCHESTER, NEW YORK, ASSIGNOR TO THE C. T. HAM MANUFACTURING COMPANY, OF SAME PLACE.

TUBULAR LANTERN.

SPECIFICATION forming part of Letters Patent No. 436,416, dated September 16, 1890.

Application filed March 4, 1890. Serial No. 342,658. (No model.)

*To all whom it may concern:*

Be it known that I, CHARLES T. HAM, a citizen of the United States, residing at Rochester, in the county of Monroe, in the State of New York, have invented certain Improvements in Tubular Lanterns, of which the following is a specification, reference being had to the accompanying drawings.

My present invention relates to certain improvements in tubular lanterns, whereby the sliding globe is held in both the elevated and depressed positions by a novel arrangement of a spring or springs arranged to bear on the globe.

My improvements are fully described and illustrated in the following specification and the accompanying drawings, and the novel features thereof specified in the claims annexed to the said specification.

My improvements in tubular lanterns are represented in the accompanying drawings, in which—

Figure 1 is a side elevation showing the globe raised in dotted lines. Fig. 2 is a side elevation taken at right angles with Fig. 1, one of the side tubes being partially broken away, so as to show the spring by which the globe is locked. Fig. 3 is a transverse section through one of the side tubes on the line 3 3, Fig. 1.

In the accompanying drawings, A represents the sliding globe of a tubular lantern, B B the globe-holding springs, and C C the side tubes. The springs B B are attached to the side tubes and extend inward so as to bear on the outer convex surface of the globe above the summit of the convexity when the globe is down and below it when the globe is elevated, so that the globe is locked in either position by the pressure of the springs against the inclined surface of the globe. The side tubes are preferably provided with a loop or stirrup D, by which the springs are supported laterally and their inward movement limited when the globe is removed. The globe is attached to the bell which slides on the central air-tube in any preferred manner—such, for instance, as the spring E and the support F— and the base-flange G may be attached to the globe or it may be supported by or attached to the burner-cone. The bell I is arranged to slide on the central air-tube H, being provided with a collar fitting the tube and with a guide J, which extends upward from the bell or collar over the top of the central tube and thence down the other side. The guide J is arranged to slide between suitable lugs or projections L on the central air-tube. The bell is provided with a lifting-catch or thumb-piece N.

The lantern is of any ordinary or preferred construction, being provided with an oil-reservoir and burner of any usual type. The support F for the globe consists of a suitable bent wire attached at its ends to the bell and passing thence downward and then encircling the globe below the bead O. The spring E is attached to the bell and surrounds a projecting ring on the upper end of the bell, so as to keep the globe in engagement with the support E, while permitting its removal by bending the spring E upward, as indicated by the dotted lines in Fig. 2.

From an examination of Fig. 1 it will be perceived that the springs B bear on the outer surface of the globe above its largest diameter, and that when the globe is raised to afford access to the wick the springs will yield outward and slide over the summit of the convexity of the globe and bear upon the globe below its greatest diameter, so that when the globe is once raised it will remain supported in the elevated position by the pressure and friction of the springs. It is obvious that a single spring might be used to accomplish this purpose; but I prefer to employ the two, as shown. The springs may extend either upward or downward from their point of attachment to the side tubes. They may be formed in any suitable way; but I prefer to make them of wire, as shown, bent into suitable shape so as to give a bearing on the globe. They are fastened to the tubes by soldering or in any other suitable way, and the loops D are secured to the tubes so as to limit the inward movement of the springs when the globe is removed and also to sustain the springs laterally.

Any suitable style of guards P may be used on my improved lantern.

I am aware that springs have been attached to the lantern-tubes with their free ends engaging slots in the globe-supporting plate, and I do not broadly claim devices of this character. In said lantern the springs normally tend to raise or hold up the globe at all times, and a separate spring-catch is used to hold the globe down, some special holding device for this purpose being a necessity. Further, to depress the globe it is necessary to grasp it or its attachments below the horizontal air-tube, which is objectionable, on account of the usually heated condition of the globe. In my improved construction the globe is positively held in either of its positions, and it can be moved up or down by simply manipulating the guide J above the air-tube, which will always be cool. Furthermore, my springs are adapted for use in a lantern in which the air distributer is not carried by the globe, as is necessary in the prior construction.

I claim—

1. The combination, with the structure of a tubular lantern provided with a sliding globe, of a spring arranged to bear on the convex outer surface of the globe, whereby the globe is locked in both its elevated and depressed positions, substantially as described.

2. The combination, with the structure of a tubular lantern, of a spring attached to one of the side tubes and arranged to bear on the convex outer surface of the globe, whereby the globe is locked in both its elevated and depressed positions, substantially as described.

3. The combination, with the structure of a tubular lantern provided with a sliding globe, of two springs attached to the side tubes and arranged to bear on the outer surface of the globe on opposite sides thereof, whereby the globe is locked in both its elevated and depressed positions, substantially as described.

CHARLES T. HAM.

Witnesses:
WM. J. MCPHERSON,
GEO. B. SELDEN.